US012700297B2

(12) United States Patent
Boiangiu et al.

(10) Patent No.: US 12,700,297 B2
(45) Date of Patent: Aug. 4, 2026

(54) LOCATING AN EMS UNIT CLOSEST TO A SOURCE OF A DISTRESS SIGNAL AND NOTIFYING PROXIMATE PERSONAL DEVICES

(71) Applicant: Microchip Technology Incorporated, Chandler, AZ (US)

(72) Inventors: Daniel Boiangiu, Bucharest (RO); Valentin Stoia, Bucharest (RO)

(73) Assignee: Microchip Technology Incorporated, Chandler, AZ (US)

( * ) Notice: Subject to any disclaimer, the term of this patent is extended or adjusted under 35 U.S.C. 154(b) by 285 days.

(21) Appl. No.: 18/532,282

(22) Filed: Dec. 7, 2023

(65) Prior Publication Data

US 2025/0111769 A1 Apr. 3, 2025

Related U.S. Application Data

(60) Provisional application No. 63/541,925, filed on Oct. 2, 2023.

(51) Int. Cl.
*G08B 27/00* (2006.01)
*G08B 5/36* (2006.01)

(52) U.S. Cl.
CPC ............. *G08B 27/001* (2013.01); *G08B 5/36* (2013.01)

(58) Field of Classification Search
CPC .................................................... G08B 27/001
USPC .................................................... 340/539.12
See application file for complete search history.

(56) References Cited

U.S. PATENT DOCUMENTS 7,005,980 B1 * 2/2006 Schmidt ............. G08B 21/0288 340/539.13
10,255,794 B1 * 4/2019 Merjanian ............ G08B 25/016
2009/0322513 A1 * 12/2009 Hwang .................... H04W 4/90 600/301
2011/0117878 A1 * 5/2011 Barash .................... G16H 40/20 340/539.12
2022/0036723 A1 * 2/2022 Varughese .............. H04W 4/80

FOREIGN PATENT DOCUMENTS

EP 3528392 A1 8/2019 ............. G08B 25/01

OTHER PUBLICATIONS

International Search Report and Written Opinion, Application No. PCT/US2024/022585, 14 pages, Aug. 28, 2024.

* cited by examiner

*Primary Examiner* — Travis R Hunnings
(74) *Attorney, Agent, or Firm* — SLAYDEN GRUBERT BEARD PLLC

(57) ABSTRACT

A method for distress signal monitoring with EMS and public notification in crowded public spaces. The method includes receiving a distress signal from a first personal device in a crowded public space; locating the first personal device closest to an EMS unit indicating that a user of the first personal device is in distress; transmitting a location of the first personal device to the EMS unit; identifying a second personal device proximate to the first personal device; and transmitting a notification signal to the second personal device indicating that a person is in distress.

20 Claims, 5 Drawing Sheets

LOCATING AN EMS UNIT CLOSEST TO A SOURCE OF A DISTRESS SIGNAL AND NOTIFYING PROXIMATE PERSONAL DEVICES

PRIORITY

This application claims priority to U.S. Provisional Patent Application No. 63/541,925, filed Oct. 2, 2023, the contents of which are hereby incorporated in their entirety.

TECHNICAL FIELD

The present disclosure relates to monitoring status of individual persons in a crowded public space and providing notice of an individual person's status to emergency medical services.

BACKGROUND

Large, crowded events such as musical festivals and sporting events may host up to 80,000-100,000 people at a single event facility, with sometimes disastrous health risks. Stadium concerts and open-air festivals are a breeding ground for major safety issues—tramplings, heat strokes, overdoses, or other medical emergencies target those in attendance, sometimes with tragic results. Many people cannot access security or medical teams in a safe amount of time because of the huge crowd blocking the victim from getting proper medical attention. Usually, when a person becomes ill at a large crowded event, it becomes the sole responsibility of the people nearby to signal to an emergency medical services (EMS) unit. This becomes increasingly difficult with larger crowds, as often incidents are not noticed, or only noticed when it is too late to render assistance.

There is a need to identify an EMS unit closest to an individual when the individual has a medical emergency or other critical issue, and assist the EMS unit in locating the individual to provide medical assistance.

SUMMARY OF THE INVENTION

Aspects provide systems and methods for a person attending a large festival, music concert, sporting event, or other crowded public event who is experiencing a medical emergency or other critical issue to receive emergency medical services (EMS) rapidly, and other persons proximate to the distressed person to be notified of the situation so as to enable them to provide assistance, and/or allow easy access of the EMS to the person experiencing the medical emergency or other critical issue.

According to an aspect, there is provided a method comprising receiving a distress signal from a first personal device in a crowded public space; locating the first personal device closest to an EMS unit; transmitting a location of the first personal device to the EMS unit indicating that a user of the first personal device is in distress; identifying a second personal device proximate to the first personal device; and transmitting a notification signal to the second personal device indicating that a person is in distress.

An aspect provides a system comprising: a control circuit to: receive a distress signal from a first personal device in a crowded public space; locate the first personal device closest to an EMS unit; transmit a location of the first personal device to the EMS unit indicating that a user of the first personal device is in distress; identify a second personal device proximate to the first personal device; and transmit a notification signal to the second personal device indicating that a person is in distress.

An aspect provides a system comprising: a control circuit to: monitor a vital sign of a user of a first personal device; determine whether the user is in distress based on the vital sign; and transmit a distress signal to a server.

BRIEF DESCRIPTION OF THE DRAWINGS

The figures illustrate examples of systems and methods for a person attending a large festival, music concert, sporting event, or other crowded public event who is experiencing a medical emergency or other critical issue to receive emergency medical services (EMS) within minutes, and other persons proximate to the distressed person to be notified of the situation so as to enable them to provide assistance and/or allow easy access of the EMS to the person experiencing the medical emergency or other critical issue.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

According to an aspect, a person attending a large festival, music concert, sporting event, or other crowded public event who is experiencing a medical emergency or other critical issue may receive emergency medical services rapidly, and other persons proximate to the distressed person may be notified of the situation so as to enable them to provide assistance and/or allow easy access of the EMS to the person experiencing the medical emergency or other critical issue. The system may include a personal device worn by persons attending the crowded public event that monitors a user's vital signs and alerts a server if the user is in distress. The server may determine the location of the personal device and may identify an emergency medical services (EMS) unit closest to the user. The server may also alert other persons attending the event that a person is in distress. By alerting other persons attending the event, the other persons can move out of the way to clear the path for the EMS unit to reach the distressed user or the other persons can provide assistance to the distressed user until the EMS unit reaches the user.

Figure 1:
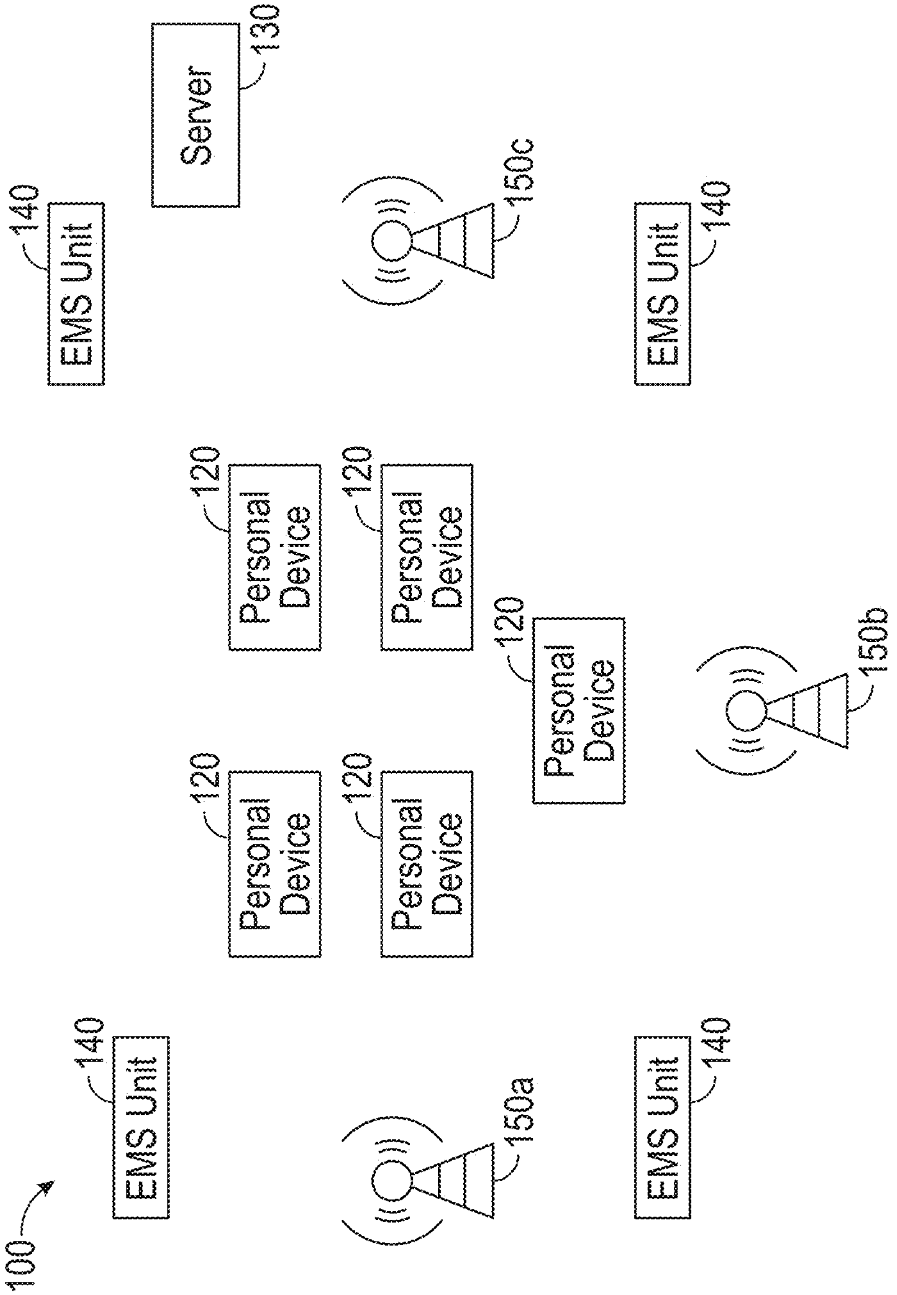
FIG. 1 illustrates a schematic diagram of a system to monitor for distress signals from attendees and to alert EMS units in a crowded public space.

FIG. 1 illustrates a schematic diagram of a system 100 to monitor for distress signals from attendees and to alert EMS units in a crowded public space. System 100 may include one or more personal devices 120*a*-120*e*, server 130, one or more EMS units 140*a*-140*d*, and one or more radio receivers 150*a*-150*c*.

Personal devices 120*a*-120*e* may be wearable devices, such as a bracelet, watch, necklace, arm band, or any other suitable wearable device. Personal device 120 may monitor one or more vital signs of a respective user wearing a respective personal device 120, including, but not limited to, heart-beat rate, SpO2 (blood oxygen saturation), and/or body temperature. Personal device 120 may monitor the one or more vital signs of the user and, if personal device 120 determines that the user's one or more vital signs are abnormal, personal device 120 may generate a distress signal and transmit the distress signal to server 130. The operation of personal device 120 is described in more detail with respect to FIGS. 2 and 5.

Server 130 may communicate bi-directionally with personal devices 120*a*-120*e* and EMS units 140*a*-140*d*. Server 130 may receive a distress signal from a respective personal device 120. After receiving the distress signal, server 130 may determine the location of the respective personal device 120 that transmitted the distress signal. Server 130 may determine the location of the personal device 120 by triangulating signals from one or more radio receivers 150*a*-150*c* with which the personal device 120 communicates. Once determined, server 130 may transmit the location of the personal device 120 to one or more EMS units 140*a*-140*d* and/or one or more personal devices 120*a*-120*e*, other than the respective person device 120. The operation of server 130 is described in more detail with respect to FIGS. 3 and 4. In some examples, server 130 may be a centralized server that receives information from one or more other servers that communicate with the other components of system 100.

Radio receivers 150*a*-150*c* may be devices to receive wireless signals from personal devices 120*a*-120*e*, EMS units 140*a*-140*d*, and/or server 130, without limitation. In one example radio receivers 150*a*-150*c* may also transmit wireless signals to personal devices 120*a*-120*e*. Radio receivers 150*a*-150*c* may communicate using any suitable wireless communications protocol such as ultra-wideband (UWB).

Figure 2:
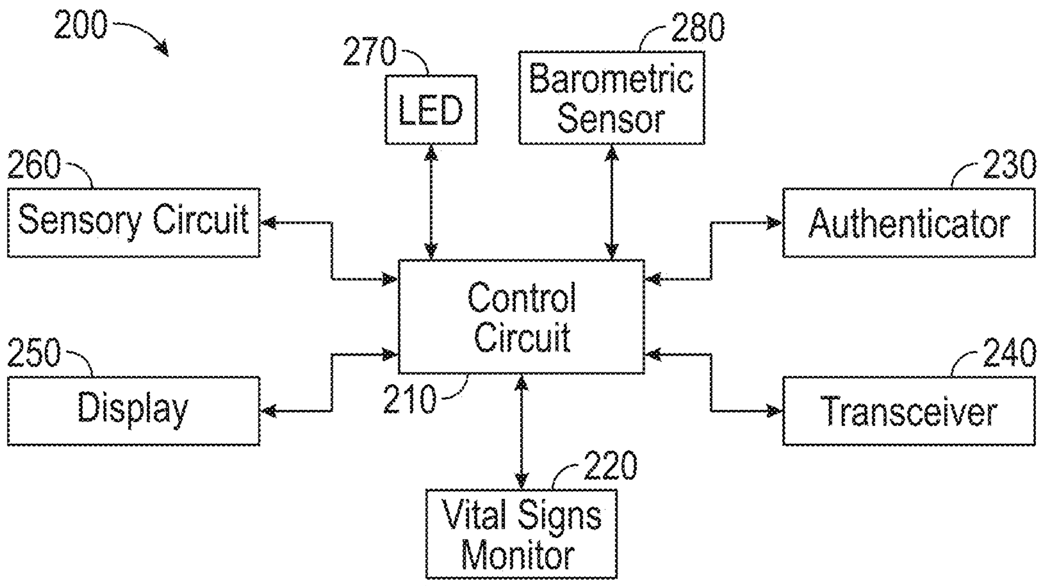
FIG. 2 illustrates a schematic diagram of a personal device used in the system to monitor for distress signals from attendees and to alert EMS units in a crowded public space.

FIG. 2 illustrates a schematic diagram of a personal device used in system 100 of FIG. 1. Personal device 200 may include control circuit 210, vital signs monitor 220, authenticator 230, transceiver 240, display 250, sensory circuit 260, LED 270, and/or barometric sensor 280. Personal device 200 may be an example of any of personal devices 120*a*-120*e*.

Control circuit 210 may be implemented in any suitable combination of analog and digital circuitry, such as a suitable microprocessor, microcontroller, control board, or other computing device having input and output interfaces for communicating with other devices, as well as memory or other storage for program logic/instructions that control circuit 210 executes to send and receive signals and process data. Control circuit 210 may receive signals from vital signs monitor 220 and analyze those signals to determine whether the user of personal device 200 is in distress. If the user of personal device 200 is in distress, control circuit 210 may send a distress signal to a server using transceiver 240. Control circuit 210 may also receive signals from the server and activate one or more of display 250, sensory circuit 260, and/or LED 270 in response. The operation of control circuit 210 is described in more detail with respect to FIG. 5.

Vital signs monitor 220 may include one or more sensors to measure the vital signs of the user of personal device 200. For example, vital signs monitor 220 may include a pulse oximeter, a thermometer, an electrical heart sensor, an infrared sensor, and/or one or more light sources to allow vital signs monitor 220 to measure the user's vital signs including, but not limited to, heart-beat rate, blood oxygen saturation, and/or body temperature. Vital signs monitor 220 may communicate the measured vital signs to control circuit 210 for analysis.

Authenticator 230 may be implemented in any suitable combination of analog and digital circuitry, such as a suitable microprocessor, microcontroller, control board, or other computing device having input and output interfaces for communicating with other devices, as well as memory or other storage for program logic/instructions that authenticator 230 executes to send and receive signals and process data. Authenticator 230 may contain information to allow the user of personal device 200 to use personal device 200 to access controlled areas of the crowded public space and/or conduct transactions in the crowded public space. For example, a user of personal device 200 may tap personal device 200 to a key card reader to gain access to a controlled area or to a payment device to make purchases.

Transceiver 240 may allow personal device 200 to wirelessly communicate with other devices, such as a server, a key card reader, and/or a payment device. Transceiver 240 may communicate using any suitable wireless communications protocol such as UWB.

Display 250 may allow a user to receive and view messages using personal device 200. For example, control circuit 210 may instruct display 250 to alert the user that the user is in distress. As another example, control circuit 210 may instruct display 250 to alert the user that another person in the crowded public space proximate to the user is in distress. For example, display 250 may display a message instructing the user to move aside so as to enable EMS personnel to access the user in distress. Display 250 may be implemented in any suitable combination of hardware and software to allow information to be displayed or otherwise conveyed to a user. For example, display 250 may include an LCD screen, a display formed of a plurality of LED lights, an LED graphical user interface, and/or any other suitable device.

Sensory circuit 260 may be implemented in any suitable combination of analog and digital circuitry, such as a suitable microprocessor, microcontroller, control board, or other computing device having input and output interfaces for communicating with other devices, as well as memory or other storage for program logic/instructions that sensory circuit 260 executes to provide haptic feedback to a user of personal device 200. For example, control circuit 210 may instruct sensory circuit 260 to activate to alert the user that assistance is being dispatched to the user. As another example, control circuit 210 may instruct sensory circuit 260 to alert the user that another person in the crowded public space proximate to the user is in distress. Sensory circuit 260 may cause vibrate, emit an audible alarm, generate an electrical sensory shock, and/or provide any other suitable haptic feedback.

LED 270 may provide visual feedback to a user of personal device 200. For example, control circuit 210 may instruct LED 270 to activate to alert the user that the user is in distress. As another example, control circuit 210 may instruct LED 270 to alert the user that another person in the crowded public space proximate to user is in distress. LED 270 may comprise a plurality of LEDs, of multiple colors, and control circuit 210 may illuminate one or more of the plurality of LEDs on personal device 200 such that the lights flash or are steadily illuminated, in one or more predetermined colors, or patterns, responsive to whether the user is in distress or is proximate a user in distress. In one example a first set of one or more predetermined colors, or patterns is activated when the user is in distress and a second set of one or more predetermined colors, or patterns is activated when the user is proximate a user in distress. For example, LED 270 may illuminate a red light when the user of the personal device is in distress and illuminate a blue light to alert the user of the personal device that another event attendee proximate to the user is in distress.

Barometric sensor 280 may include one or more sensors to measure the barometric pressure of the environment surrounding the user of personal device 200. Barometric sensor 280 may communicate the measured barometric pressure to control circuit 210 for analysis. Information from barometric sensor 280 may be used to determine the altitude/elevation of the first personal device to assist in locating the first personal device in situations, for example, where the crowded public space has multiple levels.

Figure 3:
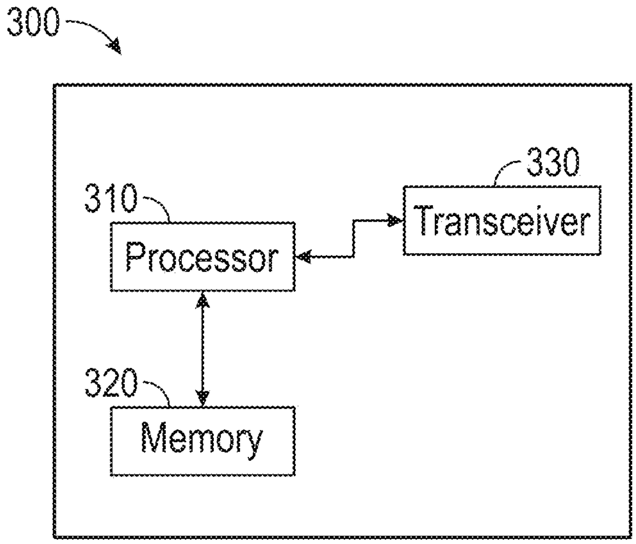
FIG. 3 illustrates a schematic diagram of a server used in the system to monitor for distress signals from attendees and to alert EMS units in a crowded public space.

FIG. 3 illustrates a schematic diagram of a server used in system 100 of FIG. 1. Server 300 may include processor 310, memory 320, and transceiver 330. Server 300 may be an example of server 130.

Processor 310 may be coupled to memory 320. Processor 310 may write data to memory 320 and may read data from memory 320. Processor 310 may be a central processing unit (CPU) or other processing device. In some examples, processor 310 and memory 320 may be implemented as any suitable combination of analog and digital circuitry, such as a suitable microprocessor, microcontroller, control board, or other computing device having input and output interfaces for communicating with other devices, as well as memory or other storage for program logic/instructions that processor 310 executes to send and receive signals and process data.

Transceiver 330 may allow server 300 to wirelessly communicate with other devices, such as a personal device and/or an EMS unit. Transceiver 330 may communicate using any suitable wireless communications protocol such as UWB.

Processor 310 may receive a distress signal from a first personal device via transceiver 330. Processor 310 may locate the first personal device via triangulation of the received distress signal, and identify an EMS unit closest to the first personal device from among the plurality of EMS units. Processor 310 may then transmit the location of the first personal device to the EMS unit closest to the first personal device such that EMS personnel associated with the EMS unit closest to the first personal device can respond to the distressed condition of the user of the first personal device. In addition to notifying the EMS unit closest to the first personal device, the processor may transmit a notification to other personal devices in the crowded public space proximate to the first personal device such that the users of the other personal devices proximate to the first personal device can clear the way for the EMS personnel to reach the distressed user. Further, processor 310 may transmit a signal to the first personal device to cause the first personal device to emit a visible and/or audible signal to assist EMS personnel in locating the distressed user. The operation of processor 310 is described in more detail with respect to FIG. 4.

Figure 4:
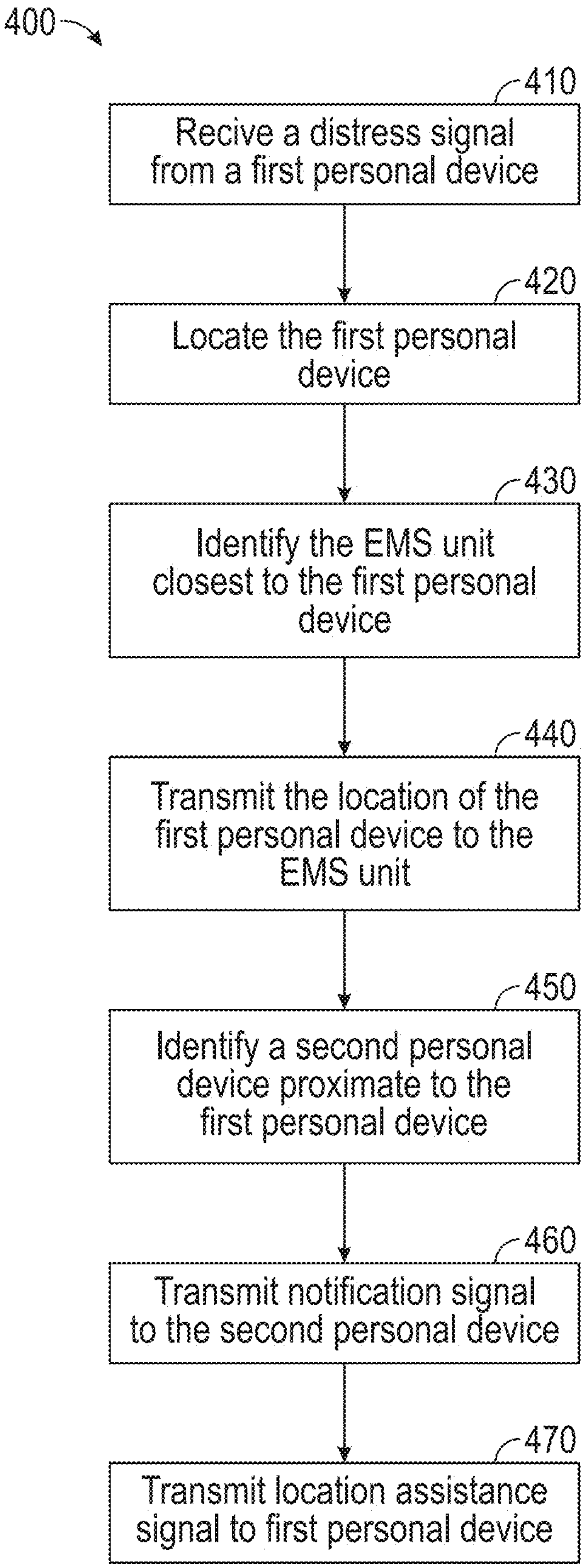
FIG. 4 illustrates a method for providing monitoring for distress signals from attendees and alerting EMS units in a crowded public space.

FIG. 4 illustrates a method for providing monitoring for distress signals from attendees and alerting EMS units in a crowded public space. Method 400 may be implemented using a server, such as server 130 and/or server 300, or any other system operable to implement method 400. Although examples have been described above, other variations and examples may be made from this disclosure without departing from the spirit and scope of these disclosed examples.

Method 400 may begin at block 410 where the server receives a distress signal from a first personal device. The first personal device may monitor the vital signs of the user wearing the first personal device and detect any abnormalities in the vital signs that indicate that the user wearing the first personal device is in distress. After the first personal device determines that the user wearing the first personal device is in distress, the first personal device transmits a distress signal to the server. The transmission may be via UWB to simplify location determination of the first personal device.

Method 400 proceeds to block 420 where the server locates the first personal device in the crowded public space. The server may determine the location of the first personal device using any suitable method, such as triangulation using information about the radio receivers with which the first personal device is using to communicate with the server. For example, three or more radio receivers may receive signals from the first personal device and the server computes the location of the first personal device using the information related to the arrival of the signal from the first personal device at the respective radio receivers. The server may compute the location using Received Signal Strength Indication (RSSI), Time of Arrival (TOA), Time Difference of Arrival (TDOA), and Angle of Arrival (AOA), any combination thereof, or any other suitable method. In some examples, the first personal device may include a barometric sensor, such as barometric sensor 280 shown in FIG. 2. The server may use the data from the barometric sensor to determine the altitude/elevation of the first personal device to assist in locating the first personal device in situations, for example, where the crowded public space has multiple levels.

Method 400 proceeds to block 430 where the server identifies the EMS unit closest to the first personal device. An EMS unit may be determined to be closest to the first personal device based on the physical distance between the EMS unit and the first personal device, the shortest travel time for the EMS unit to reach the first personal device, or any combination thereof, as explained in more detail in FIGS. 6A and 6B. For example, the crowded public space may have multiple EMS units present to respond to potential emergencies. To provide the quickest response to the distress signal received at block 410, the server identifies the EMS unit that is physically closest to the first personal device or the EMS unit with the shortest expected arrival time to the first personal device. To identify the EMS unit that may provide the quickest response, the server may compare the location of the first personal device (determined at block 420) with known locations of EMS units. Alternatively, or in addition to, the server may determine the location of the EMS units using similar methods as used in block 420, such as triangulation, to determine the location of the EMS units and compare those locations with the location of the first personal device. The server may consider the presence of obstacles between the EMS unit and the first personal device when determining which EMS unit may provide the quickest response.

At block 440, the server transmits the location of the first personal device to the EMS unit identified at block 430. The EMS personnel associated with the EMS unit can then proceed to respond to the user of the first personal device.

At block 450, the server may identify one or more second personal devices proximate to the first personal device. The server may determine the location of the second personal devices using similar methods as used in block 420, such as triangulation, to determine the locations of the second personal devices and compare those locations with the location of the first personal device. The server may determine that a second personal device is proximate to the first personal device if the second personal device is within a set radius around the first personal device. Alternatively, or in addition to, the server may identify one or more second personal devices between the EMS unit and the first personal device, as explained in more detail in FIGS. 6A and 6B.

At block 460, the server may transmit a notification signal to the one or more second personal devices identified at block 450. The notification signal may cause the second personal devices to illuminate, vibrate, and/or display a message indicating that someone nearby is in distress and that an EMS unit has been dispatched to respond to the user in distress. The notification signal may allow the user of the second personal device to move out of the way so EMS personnel can more easily locate the user in distress.

At block 470, the server may transmit a location assistance signal to the first personal device to assist EMS personnel and/or users of the one or more second personal devices in locating the user of the first personal device. The location assistance signal may cause the first personal device to illuminate and/or sound an audible alarm. Alternatively, or in addition to, the location assistance signal may trigger an alert to the user of the first personal device to indicate that assistance is being dispatched to the user, such as displaying an alert, vibrating, sounding an alarm, illuminating one or more lights, generating an electric shock, and/or generating any other suitable haptic feedback.

Although FIG. 4 discloses a particular number of operations related to method 400, method 400 may be executed with greater or fewer operations than those depicted in FIG. 4. In addition, although FIG. 4 discloses a certain order of operations to be taken with respect to method 400, the operations comprising method 400 may be completed in any suitable order.

Figure 5:
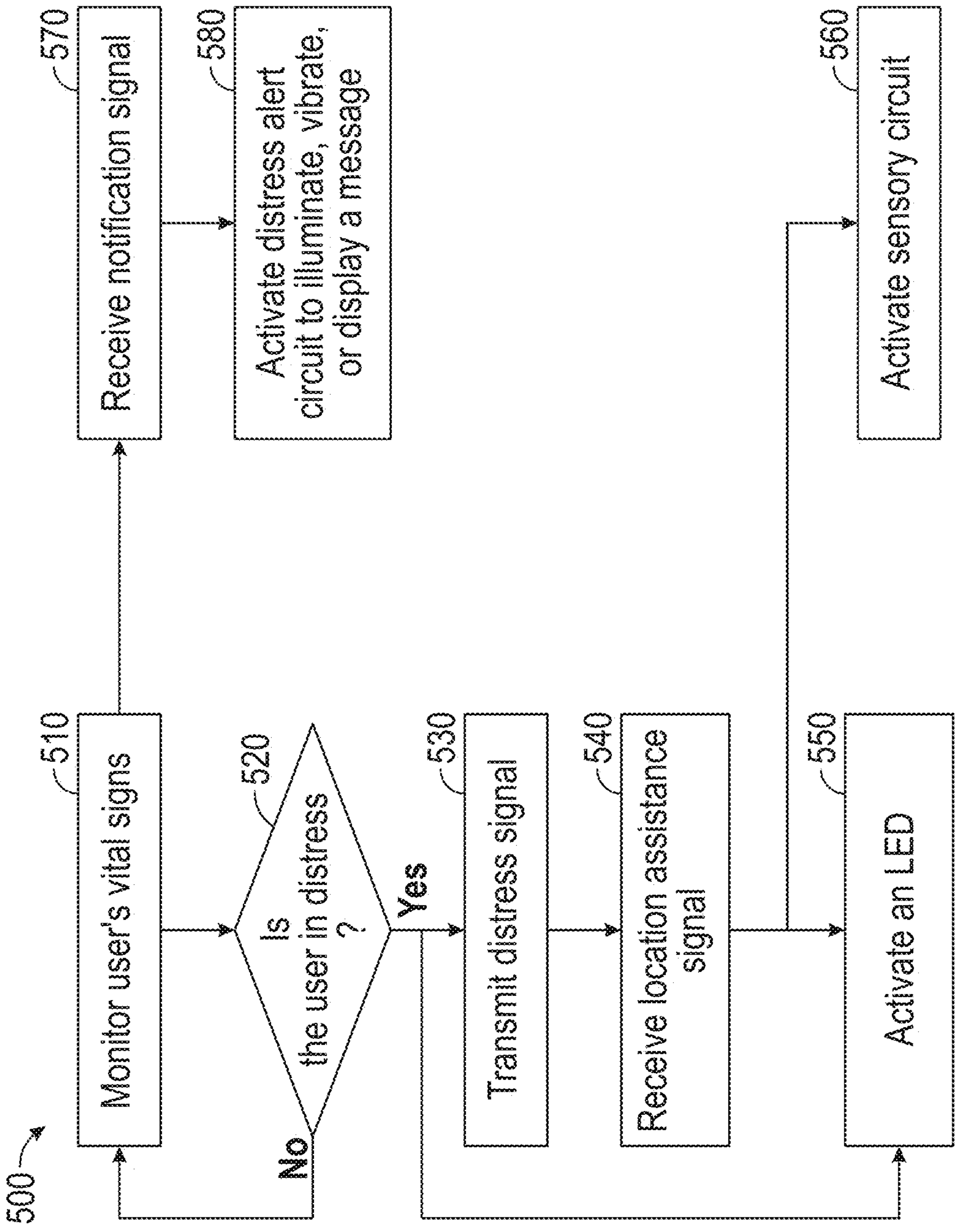
FIG. 5 illustrates a method performed by a personal device used in a system to monitor for distress signals from attendees and to alert EMS units in a crowded public space.

FIG. 5 illustrates a method performed by a personal device used in a system to monitor for distress signals from attendees and alert EMS units in a crowded public space. Method 500 may be implemented using a personal device such as personal device 120 and/or personal device 200, or any other system operable to implement method 500. Although examples have been described above, other variations and examples may be made from this disclosure without departing from the spirit and scope of these disclosed examples.

Method 500 begins at block 510 where the personal device monitors the vital signs of a user of the personal device. The personal device may monitor vital signs including, but not limited to, heart-beat rate, blood oxygen saturation, and/or body temperature.

At block 520, the personal device may determine whether the user is in distress. The determination may be based on abnormalities in the vital signs monitored at block 510, such as unusual heath status and/or low or high vital signs. If the user is not in distress, method 500 returns to block 510 and continues monitoring the user's vital signs. If the user is in distress, method 500 proceeds to block 530 where the personal device transmits a distress signal to a server. The distress signal may be transmitted by UWB.

At block 540, the personal device may receive a location assistance signal from the server. The location assistance signal may cause the personal device to activate an LED (block 550) and/or activate a sensory circuit (block 560). At block 550, when the personal device activates an LED, the personal device may activate an LED such that lights on the personal device flash in a respective predetermined pattern or are steadily illuminated to allow the user to be identified. Alternatively, or in addition to, the personal device may activate a sensory circuit so that personal device emits an audible alarm to assist in identifying the user. At block 560, when the personal device activates a sensory circuit, the personal device may instruct a display on the personal device to alert the user that the user is in distress. Alternatively, or in addition to, the personal device may activate a sensory circuit to provide haptic feedback to a user of the personal device indicating that assistance is being dispatched to the user. The sensory circuit may cause the personal device to vibrate, emit an audible alarm, generate an electrical sensory shock, and/or provide any other suitable haptic feedback.

At block 570, the personal device may receive a notification signal from the server indicating that another user at the crowded public space in proximity to the user is in distress. At block 580, the personal device may activate a display, a sensory circuit, or an LED to inform the user of the personal device that someone proximate to the user in distress. For example, the notification signal may cause a display to provide a message to a user, cause the personal device to provide haptic feedback (such as a vibration, an audible alarm, an electrical sensory shock, and/or any other suitable haptic feedback), or cause an LED to illuminate in a steady or flashing manner, in a respective predetermined pattern. The notification signal may allow the user of the personal device to clear a path for EMS personnel to access the user in distress.

Although FIG. 5 discloses a particular number of operations related to method 500, method 500 may be executed with greater or fewer operations than those depicted in FIG. 5. In addition, although FIG. 5 discloses a certain order of operations to be taken with respect to method 500, the operations comprising method 500 may be completed in any suitable order.

Figure 6A:
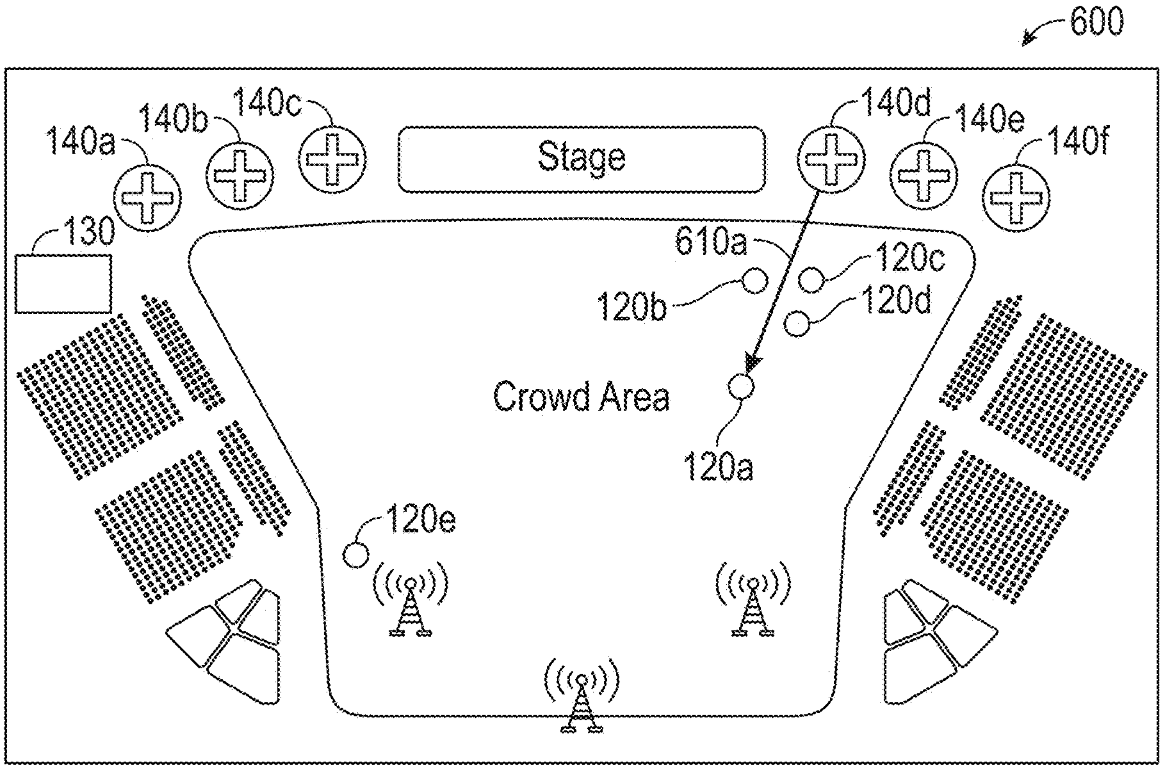
FIGS. 6A and 6B illustrate an exemplary crowded public space including a plurality of personal devices and EMS units.
Figure 6B:
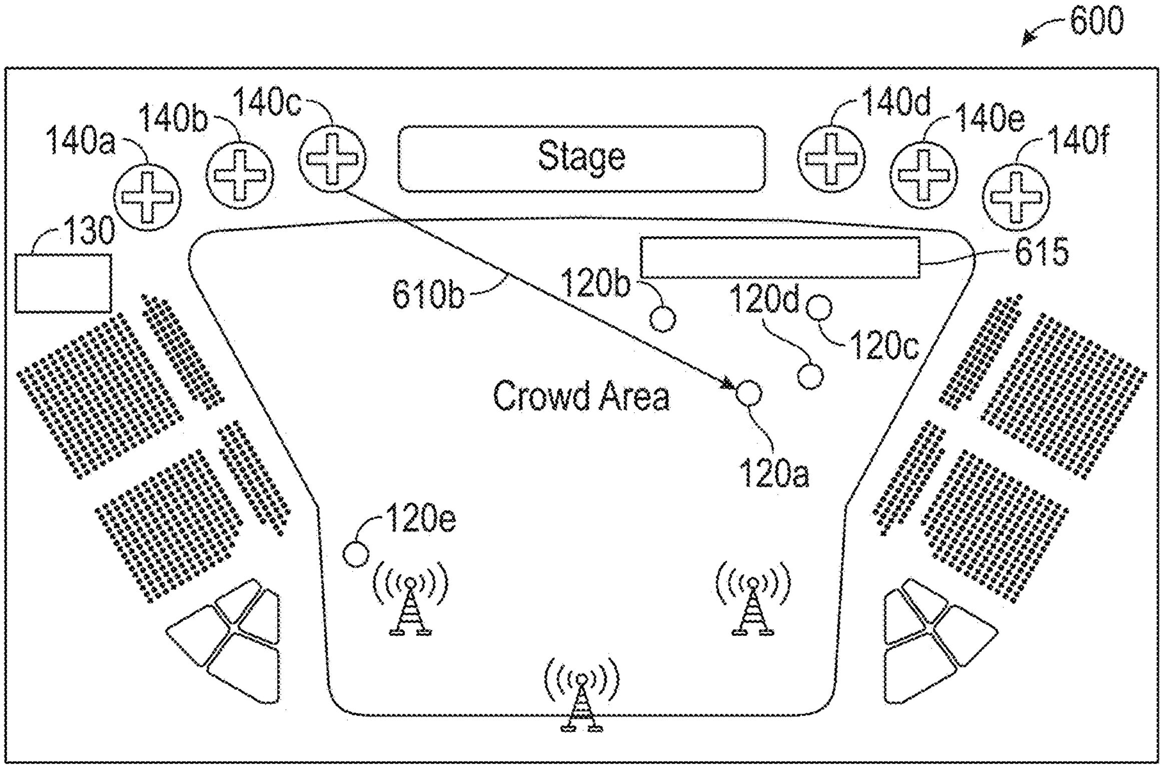

FIGS. 6A and 6B illustrate exemplary crowded public space 600 including a plurality of personal devices 120 and EMS units 140. During an event at crowded public space 600, personal device 120*a* may detect abnormal vital signs of the user of personal device 120*a*. As described with respect to FIGS. 4 and 5, personal device 120*a* may send a distress signal to server 130 and server 130 may determine the location of personal device 120*a*.

Server 130 may then identify the EMS unit 140 closest to personal device 120*a*. The EMS unit closest to personal device 120*a* may be based on physical distance or travel time. For example, as shown in FIG. 6A, server 130 may determine that EMS unit 140*d* is the closest EMS unit to personal device 120*a* because EMS unit 140*d* is physically closest to personal device 120*a* based on the physical distance between EMS unit 140*d* and personal device 120*a*. As another example, as shown in FIG. 6B, crowded public space 600 may include wall 615. Because wall 615 is between personal device 120*a* and EMS units 140*d*, 140*e*, and 140*f*, server 130 may determine that EMS unit 140*c* is the closest EMS unit to personal device 120*a* because EMS unit 140*c* has the shortest estimated travel time for EMS unit

140*c* to reach personal device 120*a*. Server 130 then notifies the closest EMS unit (EMS unit 140*d* in the example shown in FIG. 6A or EMS unit 140*c* in the example shown in FIG. 6B) of the location of personal device 120*a* and that the user of personal device 120*a* is in distress.

In addition to notifying the closest EMS unit, server 130 may identify one or more personal devices 120 proximate to personal device 120*a* or between the closest EMS unit 140 and personal device 120*a*. In the example shown in FIG. 6A, vector 610*a* illustrates the path between EMS unit 140*d* and personal device 120*a*. Server 130 may transmit a notification signal to personal devices 120*b*, 120*c*, and 120*d* to alert the users of personal devices 120*b*, 120*c*, and 120*d* that a person in the vicinity is in distress. The notification may allow the users of personal devices 120*b*, 120*c*, and 120*d* to clear a path along vector 610*a* for EMS unit 140*d* to reach the user of personal device 120*a*. In this example, server 130 may not send a notification to the user of personal device 120*e* because server 130 does not identify personal device 120*e* as being proximate to personal device 120*a* or along vector 610*a* between EMS unit 140*d* and personal device 120*a*.

In the example shown in FIG. 6B, vector 610*b* illustrates the path between EMS unit 130*c* and personal device 120*a*. Server 130 may transmit a notification signal to personal device 120*b* to alert the user of personal device 120*b* that a person in the vicinity is in distress. The notification may allow the user of personal devices 120*b* to clear a path along vector 610*b* for EMS unit 140*c* to reach the user of personal device 120*a*. In this example, server 130 may not send a notification to the user of personal devices 120*c*, 120*d*, and 120*e* because server 130 does not identify personal devices 120*c*, 120*d*, and 120*e* as being proximate to personal device 120*a* or along vector 610*b* between EMS unit 140*c* and personal device 120*a*.

The system described in this disclosure may also be deployed in other use cases. One example use case is general crowd control where a server may send one or more messages to the personal devices in the crowded public space providing instructions to the users of the personal devices. Another example use case is an option is for one personal device to locate another personal device using UWB communication. A further example use case is a sing-along mode where the server sends signals to the personal devices to display lyrics or illuminate or vibrate along with the beat of a song. Another further example use case relates to delivery services where the personal device emits a request, instead of a distress signal, and a notification signal is sent to the requesting personal device to generate a signature visible to delivery personnel or vehicles (e.g., a drone) to allow the delivery personnel or vehicle to locate the personal device. Yet another use case where the personal device emits a request for the location of a nearest service, instead of a distress signal, and the server sends location information and directional information to the personal device for the closest services (e.g., restroom or customer service) while in the crowded public space.

Although examples have been described above, other variations and examples may be made from this disclosure without departing from the spirit and scope of these disclosed examples.

The invention claimed is:

1. A method comprising:
receiving a distress signal from a first personal device;
locating an EMS unit closest to the first personal device;
transmitting a location of the first personal device to the EMS unit indicating that a user of the first personal device is in distress;
identifying a second personal device proximate to the first personal device; and
transmitting a notification signal to the second personal device indicating that a person is in distress and instructing a user of the second personal device to clear a path for the EMS unit.

2. The method of claim 1, wherein at least one of transmitting or receiving is via an Ultra Wide Band (UWB) communication link.

3. The method of claim 1, wherein the distress signal is based on detection of at least one of an abnormal heartbeat, an abnormal blood oxygen saturation, or an abnormal body temperature.

4. The method of claim 1, wherein the notification signal causes the second personal device to at least one of illuminate, vibrate, or display a message.

5. The method of claim 1, comprising transmitting a location assistance signal to the first personal device.

6. The method of claim 5, wherein the location assistance signal causes the first personal device to activate at least one of an alarm or an LED.

7. The method of claim 1, wherein locating the first personal device relative to the EMS unit is performed using triangulation.

8. A system comprising:
a control circuit to:
receive a distress signal from a first personal device in a crowded public space;
locate an EMS unit closest to the first personal device;
transmit a location of the first personal device to the EMS unit indicating that a user of the first personal device is in distress;
identify a second personal device proximate to the first personal device; and
transmit a notification signal to the second personal device indicating that a person is in distress and instructing a user of the second personal device to clear a path for the EMS unit.

9. The system of claim 8, wherein the distress signal is received using an Ultra Wide Band (UWB) communication link.

10. The system of claim 8, wherein the distress signal indicates the user of the first personal device is experiencing at least one of an abnormal heartbeat, an abnormal blood oxygen saturation, or an abnormal body temperature.

11. The system of claim 8, wherein the notification signal causes the second personal device to at least one of illuminate, vibrate, or display a message.

12. The system of claim 8, the control system to transmit a location assistance signal to the first personal device.

13. The system of claim 12, wherein the location assistance signal causes the first personal device to activate at least one of an alarm or an LED.

14. The system of claim 8, wherein locating the first personal device relative to the EMS unit is performed using triangulation.

15. A system comprising:
a control circuit to:
monitor a vital sign of a user of a first personal device;
determine whether the user is in distress based on the vital sign;
transmit a distress signal to a server; and
receive a notification signal indicating that a person near the user is in distress, the notification signal instructing the user to clear a path for an EMS unit to reach the person.

16. The system of claim 15, wherein the distress signal is transmitted using an Ultra Wide Band (UWB) communication link.

17. The system of claim 15, wherein determining whether the user is in distress is based on detecting at least one of an abnormal heartbeat, an abnormal blood oxygen saturation, or an abnormal body temperature.

18. The system of claim 15, the control circuit to:
receive a location assistance signal; and
activate a location assistance circuit to illuminate the first personal device.

19. The system of claim 15, wherein the control circuit to:
receive a location assistance signal; and
activate an LED.

20. The system of claim 15, the control circuit to:
receive a notification signal; and
activate a sensory circuit.

* * * * *